Nov. 12, 1957 P. SISKIND 2,813,246

VOLTAGE CONTROLLED MAGNETIC AMPLIFIER

Filed April 19, 1955 2 Sheets-Sheet 1

INVENTOR
PHILIP SISKIND
BY R. V. Craddock
ATTORNEY

Nov. 12, 1957 P. SISKIND 2,813,246

VOLTAGE CONTROLLED MAGNETIC AMPLIFIER

Filed April 19, 1955 2 Sheets-Sheet 2

INVENTOR
PHILIP SISKIND
BY R. V. Craddock
ATTORNEY

United States Patent Office 2,813,246

Patented Nov. 12, 1957

2,813,246

VOLTAGE CONTROLLED MAGNETIC AMPLIFIER

Philip Siskind, Great Neck, N. Y., assignor to Sperry Rand Corporation, a corporation of Delaware Application April 19, 1955, Serial No. 502,320

18 Claims. (Cl. 323—89)

This invention relates to magnetic amplifiers, and more particularly, is concerned with a magnetic amplifier having an A.-C. input and A.-C. output for use in servo systems and the like.

Efforts to improve the dynamic response characteristic of magnetic amplifiers, which was a limiting factor in their application, has resulted in a circuit design in which the time for complete response to the input signal changes is effected in a half cycle interval at the excitation voltage frequency. This fast response magnetic amplifier is achieved by setting the flux level in a saturable reactor in response to the control signal during one half cycle of the excitation signal and permitting the reactor to self-saturate in response to the excitation signal on the next half cycle. The point in the cycle at which the core saturates, called the "firing" point, is determined by the initial flux level as set by the control signal at the beginning of the half cycle in which load current flows, namely, the half cycle in which the reactor saturates.

Known circuits to achieve this fast response time in their simpler forms are impractical because of undue loading of the control signal source, resulting in substantially no power gain. One known circuit which has been proposed to overcome this difficulty is limited to operation with direct current input and output signals, and in particular, D.-C. input signal having a full wave rectified type of wave shape.

It is the general object of this invention to avoid and overcome the foregoing and other difficulties in and objections to the prior art practices by the provision of a magnetic amplifier having a half cycle response time which is controlled by an A.-C. input signal and which produces an A.-C. output signal.

Another object of this invention is to provide a fast response magnetic amplifier having substantial power gain with minimum loading on the control signal source.

Another object of this invention is the provision of a fast response magnetic amplifier that can be operated in push-pull for amplifying A.-C. servo error signals which vary in amplitude and reverse in phase.

These and other objects of the invention which will become apparent as the description proceeds are achieved according to the full wave single-ended version of the magnetic amplifier by providing a pair of saturable reactors having their power windings and control windings respectively connected in series. An A.-C. excitation voltage is connected through rectifiers to the power windings to pass current to the respective power windings on alternate half cycles, an output load being connected in series with the excitation voltage source. An A.-C. bias voltage and an A.-C. control signal are combined and connected through rectifiers to the control windings to pass current through the control windings on alternate half cycles, the bias and control voltages being phased relative to the excitation voltage such that magnetizing current flows in the control windings of the respective reactors during the half cycles when current from the excitation source is blocked by the rectifier in series with the power winding.

Power valves, each including a rectifier and resistor connected across an A.-C. voltage source, are provided in each of the power winding circuits by connecting the resistors in series with the respective power windings. The half wave voltage produced across the resistors is phased to oppose the voltage induced in the power windings by the control circuit during the non-conducting half cycle of the respective power windings. Similarly, a pair of control valves, each including a rectifier and resistor connected across an A.-C. voltage source, are connected with the resistors in series with the respective control windings. The half wave voltage produced across the resistors is phased to block the voltage induced in the control windings before the reactors have become saturated.

For a better understanding of the invention, reference should be had to the accompanying drawings, where:

Figure 1:
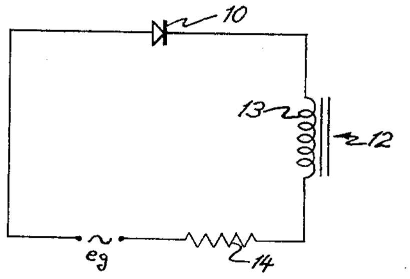
Fig. 1 is a schematic circuit diagram of a simple self-saturating circuit.
Figure 3:
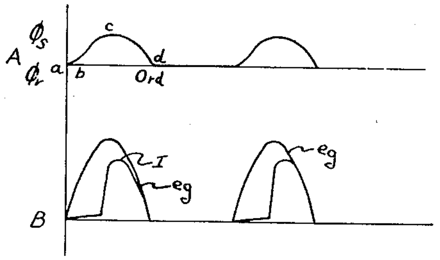
Fig. 3 is a series of curves used in the explanation of the operation of Fig. 1.

The present invention can best be understood by first considering the operation of the simple self-saturating circuit of Fig. 1. This includes a source of excitation voltage $e_g$ across which are connected in series a diode rectifier 10, a suitable reactor 12 having a power winding 13, and a load impedance 14. The reactor 12 preferably has a core material possessing a high value of remanence and high permeability, giving a "square" hysteresis loop. A typical hysteresis loop for such material is shown in the flux diagram of Fig. 2. On the half cycle in which the rectifier 10 passes current, magnetizing current begins to flow through the winding 13 of the reactor 12. The flux in the core begins to increase from its initial value $\phi_r$ (point *a* of Fig. 2 and Fig. 3A) until the core saturates. For the remainder of the half cycle following saturation (point *c* of Fig. 2 and Fig. 3A) current is limited primarily by the load impedance 14, with negligible voltage drop appearing across the power winding 13 of the reactor 12. Fig. 3A shows a plot of the change of flux $\phi$ with time. Fig. 3B shows the corresponding plot of current as a function of time. Thus it will be seen the flux reaches saturation level at point *c* the current increases to a level limited by the value of the load impedance 14 and then drops off sinusoidally as the half wave of voltage returns to zero. During the next half cycle of the excitation voltage $e_g$, current of course is blocked by the rectifier 10 but the flux level stays at a value of $\phi_r$ (point *d* of Fig. 2 and Fig. 3A), rising from that level on the next half cycle. It will be evident from Figs. 2 and 3 that the point in time during a given half cycle in which the reactor saturates depends on the initial flux level in the core, namely, $\phi_r$. The half cycle of the excitation voltage $e_g$ during which the reactor 12 saturates is called the conduction cycle, and the half cycle during which current flow is blocked by the rectifier is called the control cycle.

Figure 2:
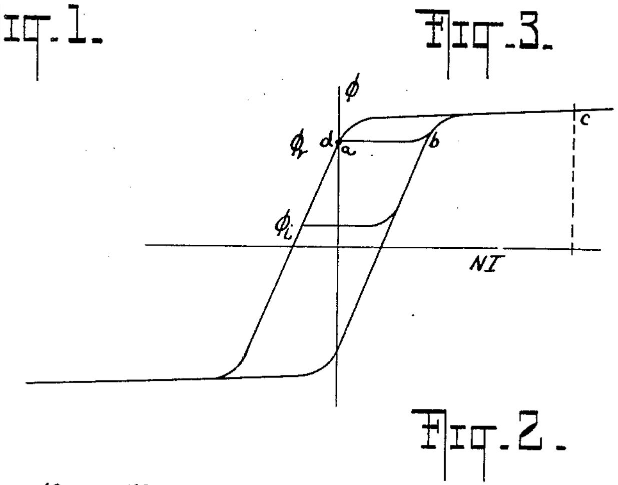
Fig. 2 is a flux diagram of the reactor of Fig. 1.
Figure 4:
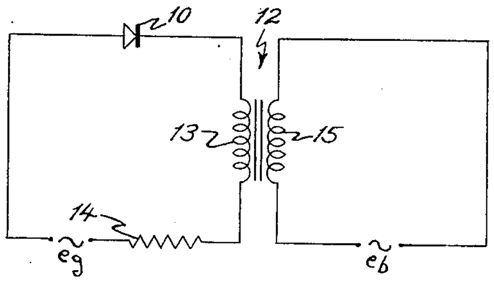
Fig. 4 is a schematic circuit diagram of an elementary amplifier.
Figure 5:
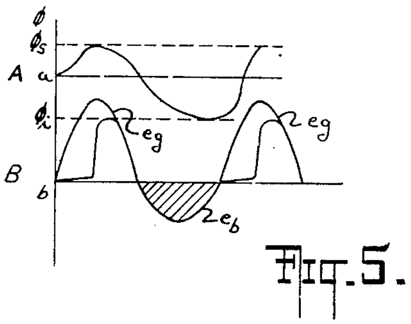
Fig. 5 is a series of curves used in explaining the operation of Fig. 4.

Referring to Fig. 4, the same circuit is shown with the addition of a control winding 15 on the reactor 12 to which is connected an A.-C. bias voltage $e_b$ in phase with the excitation voltage $e_g$. During the conduction cycle when the reactor 12 saturates, the voltage on the control winding has substantially no effect on the flux level of the core. However, on the half cycle in which the rectifier 10 blocks the flow of current in the power winding of the reactor 12, the control voltage is applied to the control winding of the reactor 12 of such polarity to reduce the flux level in the core. Thus instead of the flux level dropping back to its value of $\phi_r$, the bias voltage $e_b$ reduces the flux level of the core to a value $\phi_i$, as shown in Fig. 2 and Fig. 5A. Now when magnetizing current begins to flow in the power winding on the conducting half cycle, the flux must be raised from the level $\phi_i$ to saturation before substantial current will begin to flow in the load impedance 14. By changing the amplitude of $e_b$, the portions of an excitation voltage cycle during which there is a substantial current flow in impedance 14 is changed and hence the magnitude of the fundamental frequency component of the voltage appearing across the load impedance 14 can be varied.

Figure 6:
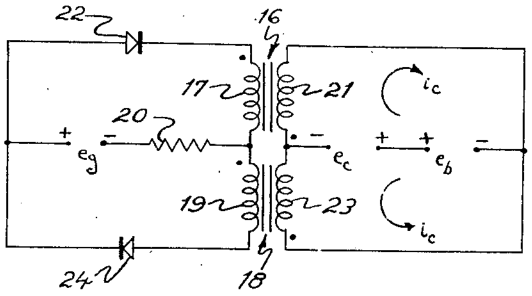
Fig. 6 is a schematic circuit diagram of a single-ended full wave amplifier circuit.

A full wave version of the circuit of Fig. 4 is shown in Fig. 6 and includes two saturable reactors 16 and 18 having their power windings 17 and 19 connected in series and having their control windings 21 and 23 connected in series. A source of excitation voltage $e_g$ is connected in series with an output impedance 20 to the series junction point of the power windings of the reactors 16 and 18, and rectifiers 22 and 24 restrict current flow to the respective power windings to alternate half cycles of the excitation voltage $e_g$.

A source of A.-C. bias voltage $e_b$ and an A.-C. signal input voltage $e_c$ in series are connected across the respective control windings 21 and 23 of the reactors 16 and 18. In the full wave circuit of Fig. 6, a demagnetizing current flows in the control winding of one reactor during the half cycle in which the other reactor is saturated by the excitation voltage $e_g$. Thus a full wave output voltage is produced across the load impedance 20, the firing point of the respective reactors being set on alternate half cycles by the amplitude of the bias voltage $e_b$ and control voltage $e_c$ added in series.

In normal operation, with the reactors 16 and 18 having a 1:1 turns ratio, the value of the bias voltage $e_b$ is made substantially equal to the excitation voltage $e_g$, which in turn is set to a value to bring the reactors 16 and 18 just up to the saturation level. Thus with $e_c$ equal to zero, substantially no current passes through the load impedance 20. With the A.-C. control signal $e_c$ 180 degrees out of phase with respect to the bias voltage $e_b$, so as in effect to subtract from the voltage $e_b$, the amount of demagnetizing current produced during the control half cycle is reduced. As a result less demagnetization current is produced and so the reactors saturate at some time in the power half cycle resulting in voltage appearing across the load impedance 20. As the amplitude of a control voltage $e_c$ as aforedescribed is increased, the reactors 16 and 18 will saturate earlier during respective power half cycles of the voltage $e_g$ so that the magnitude of the fundamental frequency component of the voltage produced across load impedance 20 is increased by an amount which is a function of the amplitude of $e_c$.

While the circuit of Fig. 6 will be seen to provide a varying A.-C. voltage across the load impedance 20 in response to voltage changes in the control voltage $e_c$, in practice this circuit is not too satisfactory, since it draws excessive current from the control voltage source $e_c$. Consider the operation during the half cycle on which the polarities are those indicated in Fig. 6, namely, the half cycle in which the reactor 16 is in its conducting half cycle. The demagnetization current is caused to flow in the reactor 18 in response to the net voltage produced by the control voltage $e_c$ and the bias voltage $e_b$ in series. The induced voltage in the power winding 19 of the reactor 18 is opposed by the net voltage across the excitation source and the load impedance 20 in series. It will be seen that when the reactor 16 saturates, the voltage drop across the load impedance is substantially equal to the excitation voltage $e_g$, so there is no net voltage opposing the induced voltage appearing across the power winding of the reactor 18. As a result, the rectifier 24 becomes unblocked and the reflected impedance seen by the control voltage source $e_c$ becomes very low, causing large currents to flow in the control circuit.

Figure 7:
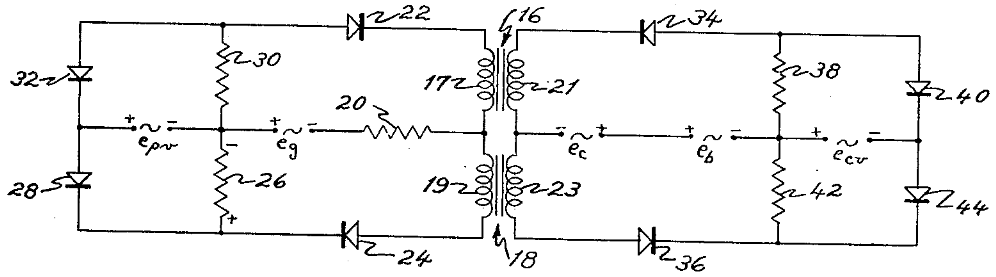
Fig. 7 is a schematic circuit diagram of a magnetic amplifier according to one modification of the present invention.

To prevent the rectifier 24 from becoming unblocked, a voltage opposing the induced voltage in the control winding 23 is introduced, as shown in Fig. 7, in the power winding circuit. This is accomplished by a power valve circuit including a resistor 26 in series with the power rectifier 24 across which is applied a half wave rectified voltage of polarity to oppose the flow of current through the rectifier 24. This voltage across the resistor 26 is produced by an A.-C. voltage source $e_{pv}$ in series with a rectifier 28. The value of $e_{pv}$ is substantially equal to the bias voltage $e_b$ so that under no circumstances will the rectifier 24 become unblocked during the control half cycle. A similar power valve circuit including a resistor 30 and rectifier 32 produces an opposing voltage on alternate half cycles of the voltage $e_{pv}$ to similarly block the rectifier 22 against flow of current from the induced voltage across the power winding 17 of the reactor 16.

Although the flow of current in the control windings of the reactors 16 and 18 after saturation has no effect on the operation of the circuit as such, the respective control windings appear as a low impedance across the control voltage and bias voltage sources, tending to draw current from the control signal source. This is prevented by series rectifiers 34 and 36 in the control winding circuits, which block the flow of current in the control windings except on the half cycle in which demagnetizing current flows.

However, with the polarities as shown in Fig. 7, before the reactor 16 saturates, the voltage across the power winding 17 of the reactor 16 induces a voltage across the control winding 21 of the reactor 16. This induced voltage is generally sufficient to unblock the rectifier 34 and cause current to flow in the control circuit. To prevent this, according to the present invention a control valve circuit is provided including a resistor 38 and a rectifier 40 connected in series across a source of alternating voltage $e_{cv}$. A similar control valve circuit including a resistor 42 and rectifier 44 connected across the source $e_{cv}$ limits the flow of current through the control voltage source during the conductive half cycle of the reactor 18 prior to saturation.

Figure 8:
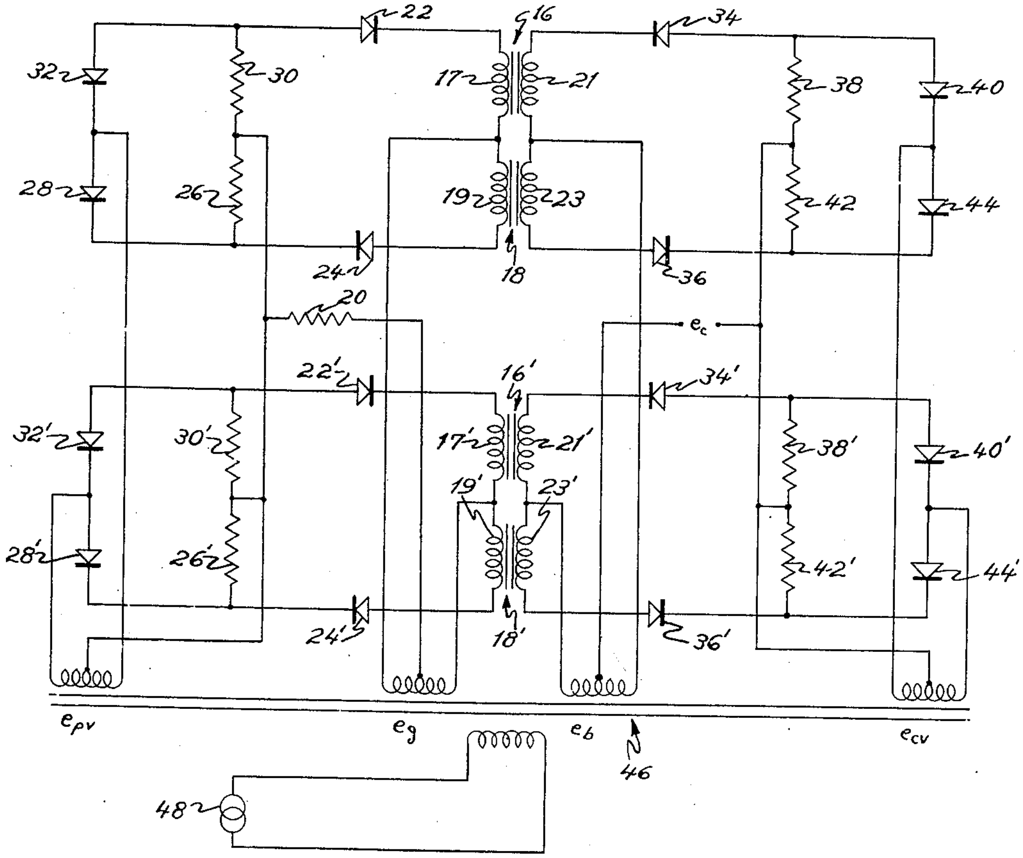
Fig. 8 is a schematic circuit diagram of a magnetic amplifier according to another modification of the present invention.

Fig. 7 is a single-ended circuit, that is, it operates only on control signals that are in phase opposition to the bias voltage. If the control voltage is in phase with the bias voltage, neither reactor ever saturates or saturates near the end of the conductive half cycle. To provide operation where the control signal is of the double-sideband suppressed carrier modulation type of signal generally found in servo systems, it is necessary to provide a circuit that responds to a phase reversal of the input control signal $e_c$. To accomplish such operation, two amplifiers of the type described in connection with Fig. 7 can be operated in push-pull, as shown in Fig. 8. In the push-pull modification of Fig. 8, all the applied voltages are shown derived from a single transformer 46, having the primary connected to an A.-C. voltage source 48. There are four center-tapped secondary windings which respectively supply the control voltage $e_{pv}$ for the power valve circuits, the excitation voltage $e_g$ for the power winding circuits, the bias voltage $e_b$ for the control winding circuits, and the control valve voltage $e_{cv}$ for the control valve circuits. Operation of the two single-ended circuits in the push-pull version of Fig. 8 is the same as described above, one or the other of the single-ended circuits providing current through the load impedance, depending on the relative phase between the control voltage $e_c$ and the bias voltage $e_b$.

From the above description it will be seen that the various objects of the invention have been achieved by the provision of a fast response magnetic amplifier providing an A.-C. output signal in response to an A.-C. input signal. The response time is within a half cycle of the excitation voltage. Moreover, by virtue of the power valve circuits and control valve circuits, current from the control signal source is limited to the current necessary for demagnetization of the cores of the reactors.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A magnetic amplifier comprising a pair of reactors, each reactor including a power winding and a control winding on a magnetic core, the power windings of the reactors being connected together in series and the control windings being connected together in series, a first pair of resistors connected together in series, a first pair of rectifiers respectively connecting the opposite ends of the first pair of series connected resistors to the opposite ends of the series connected power windings, a source of alternating excitation voltage and a load impedance connected in series between the series junction of the first pair of resistors and the series junction of the power windings, the first pair of rectifiers being connected to pass current in opposite directions through the load on alternate half cycles of the excitation voltage, means for applying half wave rectified voltages across said first pair of resistors including a second pair of rectifiers connected in series across the resistors and a source of alternating potential connected between the series junction of the rectifiers and the series junction of the first pair of resistors, the second pair of rectifiers being connected to pass current through the respective ones of said first pair of resistors on alternate half cycles of said alternating potential source, a second pair of series connected resistors, a third pair of rectifiers respectively connecting the opposite ends of the second pair of series connected resistors to the opposite ends of the series connected control windings, an alternating bias voltage source and an alternating control signal source connected in series between the series junction of the control windings and series junction of the second pair of resistors, the third pair of rectifiers being connected to pass current through the respective control windings on alternate half cycles of the bias voltage, and means for applying half wave rectified voltage across said second pair of resistors including a fourth pair of rectifiers connected in series across the second pair of resistors and a source of alternating voltage connected between the series junction of the fourth pair of rectifiers and the series junction of the second pair of resistors, the fourth pair of rectifiers being connected to pass current through the respective ones of said second pair of resistors on alternate half cycles of said last-named alternating voltage source.

2. A magnetic amplifier comprising a pair of reactors, each reactor including a power winding and a control winding on a magnetic core, the power windings of the reactors being connected together in series and the control windings being connected together in series, a first pair of resistors connected together in series, a first pair of rectifiers respectively connecting the opposite ends of the first pair of series connected resistors to the opposite ends of the series connected power windings, a source of alternating excitation voltage and a load impedance connected in series between the series junction of the first pair of resistors and the series junction of the power windings, the first pair of rectifiers being connected to pass current in opposite directions through the load on alternate half cycles of the excitation voltage, means for applying half wave rectified voltages across said first pair of resistors, a second pair of series connected resistors, a third pair of rectifiers respectively connecting the opposite ends of the second pair of series connected resistors to the opposite ends of the series connected control windings, an alternating bias voltage source and an alternating control signal source connected in series between the series junction of the control windings and series junction of the second pair of resistors, the third pair of rectifiers being connected to pass current through the respective control windings on alternate half cycles of the bias voltage, and means for applying half wave rectified voltages across said second pair of resistors.

3. Apparatus comprising first and second saturable reactors each having a power winding and a control winding, a load impedance and an alternating excitation voltage source connected in series, first and second rectifiers respectively connected in series with the power windings of the first and second reactors, first and second sources of half wave rectified voltage connected in series with the respective power windings of the first and second reactors, the polarity of the half wave rectified voltages being such as to oppose the flow of current in a forward direction through the first and second rectifiers, the respective series connected power windings, rectifiers, and half wave rectified voltage sources being connected in parallel across the series connected load impedance and excitation voltage source, an alternating control voltage source and an alternating bias voltage source connected in series, third and fourth rectifiers respectively connected in series with the control windings of the first and second reactors, and third and fourth sources of half wave rectified voltage connected in series with the respective control windings of the first and second reactors, the polarity of the half wave rectified voltages being such as to oppose the flow of current in a forward direction through the third and fourth rectifiers, the respective series connected control windings, rectifiers, and half wave rectified voltage sources being connected in parallel across the series connected control and bias voltage sources.

4. A magnetic amplifier for producing a variable output voltage across a load impedance in response to a reversible phase alternating control signal from a control signal source, said amplifier comprising a pair of circuits in push-pull relationship, each circuit including first and second saturable reactors each having a power winding and a control winding, first and second rectifiers respectively connected in series with the power windings of the first and second reactors, first and second sources of half wave rectified voltage connected in series with the respective power windings of the first and second reactors, the polarity of the half wave rectified voltages being such as to oppose the flow of current in a forward direction through the first and second rectifiers, a center-tapped alternating excitation voltage source, the load impedance being connected to said center-tap, the respective series connected power windings, rectifiers, and half wave rectified voltage sources of one of said pair of circuits being connected in parallel across the load impedance and one half of the center-tapped voltage source, the respective series connected power windings, rectifiers, and half wave rectified voltage sources of the other of said pair of circuits being connected in parallel across the load impedance and the other half of the center-tapped voltage source, third and fourth rectifiers respectively connected in series with the control windings of the first and second reactors, and third and fourth sources of half wave rectified voltage connected in series with the respective control windings of the first and second reactors, the polarity of the half wave rectified voltages being such as to oppose the flow of current in a forward direction through the third and fourth rectifiers, a center-tapped alternating bias voltage source, the control signal source being connected to said center-tap, the respective series connected power windings, rectifiers, and half wave voltage sources of one of said pair of circuits being connected in parallel across the control signal source and one half of the center-tapped bias voltage source, the respective series connected control windings, rectifiers, and half wave rectified voltage sources of the other of said pair of circuits being connected in parallel across the control signal source and the other half of the center-tapped bias voltage source.

5. Apparatus comprising first and second saturable reactors each having a power winding and a control winding, a load impedance and an alternating excitation voltage source connected in series, first and second rectifiers respectively connected in series with the power windings of the first and second reactors, first and second sources of half wave rectified voltage connected in series with the respective power windings of the first and second reactors, the polarity of the half wave rectified voltages being such as to oppose the flow of current in a forward direction through the first and second rectifiers, the respective series connected power windings, rectifiers, and half wave rectified voltage sources being connected in parallel across the series connected load impedance and excitation voltage source, an alternating control voltage source and an alternating bias voltage source connected in series, and third and fourth rectifiers respectively connected in series with the control windings of the first and second reactors, the respective series connected control windings and rectifiers being connected in parallel across the series connected control and bias voltage sources.

6. Apparatus comprising first and second saturable reactors each having a power winding and a control winding, a load impedance and an alternating excitation voltage source connected in series, first and second rectifiers respectively connected in series with the power windings of the first and second reactors, first and second sources of half wave rectified voltage connected in series with the respective power windings of the first and second reactors, the polarity of the half wave rectified voltages being such as to oppose the flow of current in a forward direction through the first and second rectifiers, the respective series connected power windings, rectifiers, and half wave rectified voltage sources being connected in parallel across the series connected load impedance and excitation voltage source, an alternating control voltage source and an alternating bias voltage source connected in series, the respective series connected control windings being connected in parallel across the series connected control and bias voltage sources.

7. Apparatus comprising first and second saturable reactors each having a power winding and a control winding, a load impedance and an alternating excitation voltage source connected in series, first and second rectifiers respectively connected in series with the power windings of the first and second reactors, the respective series connected power windings and rectifiers being connected in parallel across the series connected load impedance and excitation voltage source, an alternating control voltage source and an alternating bias voltage source connected in series, third and fourth rectifiers respectively connected in series with the control windings of the first and second reactors, and third and fourth sources of half wave rectified voltage connected in series with the respective control windings of the first and second reactors, the polarity of the half wave rectified voltages being such as to oppose the flow of current in a forward direction through the third and fourth rectifiers, the respective series connected control windings, rectifiers, and half wave rectified voltage sources being connected in parallel across the series connected control and bias voltage sources.

8. In a magnetic amplifier having a pair of unidirectional conductive parallel load current circuits connected to an alternating excitation voltage source for supplying power to a load, and having a pair of unidirectionally conductive parallel control current circuits connected to an alternating control voltage source and magnetically linked to the load current circuits for controlling the flow of current through the load current circuits in response to the control signal, first and second sources of half wave rectified voltage serially connected respectively in said parallel load current circuits, the polarity of the half wave rectified voltages being such as to oppose the flow of current in said load current circuits induced magnetically by the flow of current in said control current circuits, and third and fourth sources of half wave rectified voltage serially connected respectively in said parallel control current circuits, the polarity of the half wave rectified voltages being such as to oppose the flow of current in said control current circuits induced magnetically by the flow of current in said load current circuits.

9. In a magnetic amplifier having a pair of unidirectionally conductive parallel load current circuits connected to an alternating excitation voltage source for supplying power to a load, and having a pair of unidirectionally conductive parallel control current circuits connected to an alternating control voltage source and magnetically linked to the load current circuits for controlling the flow of current through the load current circuits in response to the control signal, first and second sources of half wave rectified voltage serially connected respectively in said parallel load current circuits, the polarity of the half wave rectified voltages being such as to oppose the flow of current in said load current circuits induced magnetically by the flow of current in said control current circuits.

10. In a magnetic amplifier having a pair of unidirectionally conductive parallel load current circuits connected to an alternating excitation voltage source for supplying power to a load, and having a pair of unidirectionally conductive parallel control current circuits connected to an alternating control voltage source and magnetically linked to the load current circuits for controlling the flow of current through the load current circuits in response to the control signal, first and second sources of half wave rectified voltage serially connected respectively in said parallel control current circuits, the polarity of the half wave rectified voltages being such as to oppose the flow of current in said control current circuits induced magnetically by the flow of current in said load current circuits.

11. A magnetic amplifier for energizing a load from an alternating excitation voltage source in response to the output of an alternating control signal source, said amplifier including a pair of saturable reactors having power windings and control windings, the power windings of the respective reactors being connected in parallel, load current paths in series with the excitation voltage source and the load, unidirectional conducting means in each of said load current paths for limiting current flow from the excitation source through the respective power windings to alternate half cycles of the excitation voltage, the control windings of the respective reactors being connected in parallel control current paths in series with the control signal source, unidirectional conductive means in each of said control current paths for limiting current flow from the control signal source through the respective control windings to alternate half cycles of the control signal, means in each of said parallel load current paths for blocking the flow of current induced by the flow of current in the control windings of said reactors during the non-conducting half cycles of the respective parallel load current paths, and means in each of the parallel control current paths for blocking the flow of current induced by the flow of current in the power windings of said reactors during the non-conducting half cycles of the respective parallel control current paths.

12. A magnetic amplifier for energizing a load from an alternating excitation voltage source in response to the output of an alternating control signal source, said amplifier including a pair of saturable reactors having power windings and control windings, the power windings of the respective reactors being connected in parallel, load current paths in series with the excitation voltage source and the load, unidirectional conducting means in each of said load current paths for limiting current flow from the excitation source through the respective power windings to alternate half cycles of the excitation voltage, the control windings of the respective reactors being connected in parallel control current paths in series with the control signal source, unidirectional conductive means in each of said control current paths for limiting current flow from the control signal source through the respective control windings to alternate half cycles of the control sginal, and means in each of said parallel load current paths for blocking the flow of current induced by the flow of current in the control windings of said reactors during the non-conducting half cycles of the respective parallel load current paths.

13. A magnetic amplifier for energizing a load from an alternating excitation voltage source in response to the output of an alternating control signal source, said amplifier including a pair of saturable reactors having power windings and control windings, the power windings of the respective reactors being connected in parallel, load current paths in series with the excitation voltage source and the load, unidirectional conducting means in each of said load current paths for limiting current flow from the excitation source through the respective power windings to alternate half cycles of the excitation voltage, the control windings of the respective reactors being connected in parallel control current paths in series with the control signal source, unidirectional conductive means in each of said control current paths for limiting current flow from the control signal source through the respective control windings to alternate half cycles of the control signal, and means in each of the parallel control current paths for blocking the flow of current induced by the flow of current in the power windings of said reactors during the non-conducting half cycles of the respective parallel control current paths.

14. Apparatus comprising a source of alternating excitation voltage, a load impedance, a saturable reactor having a power winding and a control winding, the excitation voltage source, load impedance and power winding being serially connected to form a single load current path, unidirectional conductive means in said path to limit the flow of load current from the source through the power winding of the reactor to alternate half cycles of the excitation voltage, a source of alternating control voltage connected in series with the control winding to form a single control current path, unidirectional conductive means in said path to limit the flow of control current from the control voltage source to alternate half cycles of the control voltage, the control voltage and excitation voltage being phased to provide load current and control current alternately, means including a source of half wave rectified voltage in the load current path to block the flow of current induced in the power winding by the flow of current in the control winding during the non-conductive half cycle of the load current path, and means including a source of half wave rectified voltage in the control current path to block the flow of current induced in the control winding by the flow of current in the load winding during the non-conductive half cycles of the control current path.

15. Apparatus comprising a source of alternating excitation voltage, a load impedance, a saturable reactor having a power winding and a control winding, the excitation voltage source, load impedance and power winding being serially connected to form a single load current path, unidirectional conductive means in said path to limit the flow of load current from the source through the power winding of the reactor to alternate half cycles of the excitation voltage, a source of alternating control voltage connected in series with the control winding to form a single control current path, unidirectional conductive means in said path to limit the flow of control current from the control voltage source to alternate half cycles of the control voltage, the control voltage and excitation voltage being phased to provide load current and control current alternately, means in the load current path to block the flow of current induced in the power winding by the flow of current in the control winding during the non-conductive half cycle of the load current path, and means in the control current path to block the flow of current induced in the control winding by the flow of current in the load winding during the non-conductive half cycles of the control current path.

16. In combination, a saturable reactor having a power winding and a control winding, a load impedance coupled to one end of said power winding, means including excitation voltage supply means and first unidirectional conductive means coupled between the other end of said power winding and said impedance for providing a load current path through which load current flows in one direction on alternate half cycles of an alternating excitation voltage, demagnetizing current supply means and control voltage supply means coupled in series with one end of said control winding, second unidirectional means coupled between said last-named means and the other end of said control winding for forming a control current path through which demagnetizing current flows in one direction on alternate half cycles of an alternating demagnetizing voltage, and means coupled to said first unidirectional conductive means for constraining current flow therethrough on alternate half cycles of the excitation voltage opposite to the alternate half cycles during which load current flows in said one direction.

17. The combination as set forth in claim 16, further including further means coupled to said second unidirectional conductive means for constraining current flow therethrough on alternate half cycles of the demagnetizing voltage opposite the alternate half cycles during which said demagnetizing current flows.

18. A magnetic amplifier for providing an output voltage proportional to the output of a control signal source, said amplifier including a pair of saturable reactors each having a power winding and a control winding, the power windings of the respective reactors being connected in parallel load current paths with a load in series with a first pair of terminals for receiving an alternating excitation voltage forming a common branch for said paths, unidirectional conducting means in each of said load current paths for limiting magnetizing current flow for said reactors through the respective power windings to alternate half cycles of an excitation voltage, the control windings of the respective reactors being connected in parallel control current paths with a second pair of terminals for receiving an alternating demagnetizing voltage in series with a third pair of terminals for receiving a control voltage, said second and third pairs of terminals being in a common branch for said control current paths, unidirectional conductive means in each of said control current paths for limiting demagnetizing current flow for said reactors through the respective control windings to alternate half cycles of a demagnetizing voltage, means coupled to each of said load current paths for blocking the flow of current by voltages induced by the flow of current in said control windings during non-conducting half cycles of the respective parallel load current paths, and means coupled to each of the control current paths for blocking the flow of current by voltages induced by the flow of current in said power windings during non-conducting half cycles of the respective parallel control current paths.

References Cited in the file of this patent

UNITED STATES PATENTS 2,717,965 Ramey ---------------- Sept. 13, 1955